United States Patent
Dixon

(10) Patent No.: US 7,840,933 B2
(45) Date of Patent: Nov. 23, 2010

(54) SOFTWARE APPLICATION MANAGEMENT FOR DISTRIBUTING RESOURCES AND RESOURCE MODELING

(75) Inventor: Ralph E. Dixon, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1836 days.

(21) Appl. No.: 10/926,907

(22) Filed: Aug. 26, 2004

(65) Prior Publication Data

US 2005/0033624 A1 Feb. 10, 2005

Related U.S. Application Data

(63) Continuation-in-part of application No. 10/635,086, filed on Aug. 6, 2003, now abandoned.

(51) Int. Cl.
G06F 9/44 (2006.01)
G06F 9/45 (2006.01)

(52) U.S. Cl. ............... 717/100; 717/103; 717/120

(58) Field of Classification Search ......... 717/100–104, 717/120–122; 709/203–204
See application file for complete search history.

(56) References Cited

U.S. PATENT DOCUMENTS

| | | | | |
|---|---|---|---|---|
| 5,446,895 A | * | 8/1995 | White et al. | ............... 717/101 |
| 6,073,214 A | * | 6/2000 | Fawcett | ................. 711/133 |
| 6,195,795 B1 | * | 2/2001 | Block et al. | ................. 717/101 |
| 6,226,784 B1 | * | 5/2001 | Holmes et al. | .............. 717/100 |
| 6,249,769 B1 | | 6/2001 | Ruffin et al. | |
| 6,402,618 B1 | * | 6/2002 | Reed et al. | ................... 463/40 |
| 6,526,387 B1 | | 2/2003 | Ruffin et al. | |
| 7,051,316 B2 | * | 5/2006 | Charisius et al. | ............ 717/103 |

(Continued)

OTHER PUBLICATIONS

Jansen et al., "Definition and validation of the key process of release, delivery and deployment for product software vendors: turning the ugly duckling into a swan", IEEE ICSM, pp. 1-10, 2006.*

(Continued)

*Primary Examiner*—Anil Khatri
(74) *Attorney, Agent, or Firm*—Schmeiser, Olsen & Watts; Anna L. Linne

(57) ABSTRACT

A method for managing a plurality of software applications. An application assessment score is computed for each application. A delivery model is selected for each of said applications. The delivery model is a Local model, a Remote model, or a Local-Remote model. The Local model, the Remote model, and the Local-Remote model are each relative to a local geographical area. The delivery model is selected as function of the application assessment score. The method may be implemented using a computer program product that includes a computer usable medium having a computer readable program code embodied therein. The computer readable program code is adapted to execute the steps of the method.

30 Claims, 24 Drawing Sheets

U.S. PATENT DOCUMENTS

| | | | |
|---|---|---|---|
| 7,137,099 B2 * | 11/2006 | Knight et al. | 717/100 |
| 7,143,409 B2 * | 11/2006 | Herrero | 717/178 |
| 7,272,815 B1 * | 9/2007 | Eldridge et al. | 717/101 |
| 7,272,823 B2 * | 9/2007 | Ball | 717/125 |
| 7,331,034 B2 * | 2/2008 | Anderson | 717/103 |
| 7,337,428 B2 * | 2/2008 | Kipman et al. | 717/100 |
| 7,340,491 B2 * | 3/2008 | Campbell | 707/204 |
| 7,467,371 B1 * | 12/2008 | Meredith et al. | 717/104 |
| 7,506,302 B2 * | 3/2009 | Bahrami | 717/100 |
| 7,562,346 B2 * | 7/2009 | Jhanwar et al. | 717/120 |
| 2001/0051913 A1 | 12/2001 | Vashistha et al. | |
| 2002/0128895 A1 | 9/2002 | Broderick et al. | |
| 2002/0174000 A1 | 11/2002 | Katz et al. | |

OTHER PUBLICATIONS

Reddy N, "Testing processess in business critical chain software lifecycle", IEEE, pp. 238-242, 2009.*

Lee et al, "A framework for managing optimizatiion models for supply chain software agents", ACM ICEC, pp. 373-380, 2006.*

Jansen et al, "Evaluating the release, delivery and deployment processes of eight large product software vendors applying the customer configuration update model", ACM WISER, pp. 65-68, 2006.*

\* cited by examiner

|   | A | B | C | D | E | F |
|---|---|---|---|---|---|---|
| 1 | | | | | | |
| 2 | | | | | | |
| 3 | Legend for fields: | | | | | |
| 4 | Shading | Description | | | | |
| 5 | | Enterable fields | | | | |
| 6 | | Calculated Fields | | | | |
| 7 | | Control Totals | | | | |
| 8 | | | | | Total Applications | |
| 9 | | | | | 7 | |
| 10 | | | | | | |
| 11 | Business Area | Business Function | | App ID | Application Name | Application Description |
| 12 | Finance | Accounts Payable | | 1 | AP | This application tracks account payable |
| 13 | Finance | Accounts Receivable | | 2 | AR | This application tracks account receivables |
| 14 | HR | Employee Records | | 3 | Emp Records | Employee master records for state and federal |
| 15 | HR | Evaluations | | 4 | PBC | Personal business Commitments |
| 16 | Logistics | Shipping | | 5 | Ship to Customer | Order and customer tracking system |
| 17 | Logistics | Tracking | | 6 | Location Trackor | GPS system to locate Trucks in route |
| 18 | Payroll | Payroll | | 7 | Emp Payroll | Payroll for city, state, and federal governments |
| 19 | | | | 8 | | |
| 20 | | | | 9 | | |
| 21 | | | | 10 | | |

*FIG. 2*

|   | H | I | J | K | L | M | N | O | P | Q | R | S |
|---|---|---|---|---|---|---|---|---|---|---|---|---|
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | EOL # |
| 8 | | | | | | | | | | | | 24 |
| 9 | | | | | | | | | | | | |
| 10 | | | | | | | | | | | | |
| 11 | Hardware Platform | Software Platform | Database | Application Language | Package Flag (Y or N) | Package Vendor | Age of Application (years) | | Number of Users Supported | | | Life Expectancy Months |
| 12 | IBM | AIX | DB/2 | C++ | | | | | | | | 45 |
| 13 | IBM | AIX | DB/2 | C++ | | | | | | | | 45 |
| 14 | Mainframe | MVS | vsam | COBOL | | | | | | | | 50 |
| 15 | PC | Win 2000 | Flatfile | C | | | | | | | | 25 |
| 16 | IBM | AIX | DB/2 | C/C++ | | | | | | | | 66 |
| 17 | Sun | Solaris | Flatfile | C | | | | | | | | 99 |
| 18 | Mainframe | MVS | IMS | COBOL | | | | | | | | 99 |
| 19 | | | | | | | | | | | | |
| 20 | | | | | | | | | | | | |
| 21 | | | | | | | | | | | | |

*FIG. 3*

|   | U | V | W | X | Y | Z | AA | AB | AC | AD | AE | AF | AG | AH | AI |
|---|---|---|---|---|---|---|----|----|----|----|----|----|----|----|----|
| 1 | | | | | | | | | | | | | | | |
| 2 | | | | | | | | | | | | | | | |
| 3 | | | | | | | | | | | | | | | |
| 4 | | | | | | | | | | | | | | | |
| 5 | | | | | | | | | | | | | | | |
| 6 | | | | | | | | | | | | | | | |
| 7 | | | | | | | | | | | | | | | |
| 8 | | | | | | High Facing % | | | | | | | | | Total FTEs |
| 9 | | | | | | 65% | | | | | | | | | 282 |
| 10 | | | | | | | | | FTE ANALYSIS | | | | | | |
| 11 | % of FTE doing Break/Fix | % of FTE doing Enhancements | % of FTE doing Ad Hoc Support | % of FTE doing Testing | % of FTE doing Rollout | % of FTE doing Customer Facing | % of FTE doing Project Management | % of FTE doing Development | % of Other Activities (i.e., DBA, BA, Training) | Total of %'s | Location (City, State, Province, Country) | Team Size (FTEs) +6 YRS EXP | Team Size (FTEs) 3-6 YRS EXP | Team Size (FTEs) 0-3 YRS EXP | Total FTEs (Auto-sum of 3 Team FTE columns) |
| 12 | 10% | 10% | 10% | 10% | 10% | 10% | 10% | 30% | | 100% | Key West, FL | 55 | | | 55 |
| 13 | | 40% | 40% | | 5% | 6% | 49% | | 40% | 100% | Key West, FL | 77 | 4 | 23 | 27 |
| 14 | 30% | | | 70% | | 10% | | 20% | | 100% | Key West, FL | | 33 | | 77 |
| 15 | | | | 60% | | 30% | | | | 100% | Key West, FL | | 33 | 10 | 33 |
| 16 | 100% | | | | | | | | | 100% | Key West, FL | 5 | 20 | 5 | 30 |
| 17 | 100% | | | | | | | | | 100% | Key West, FL | 40 | 2 | 3 | 15 |
| 18 | | | | | | | | | | 0% | | | | | 45 |
| 19 | | | | | | | | | | 0% | | | | | 0 |
| 20 | | | | | | | | | | 0% | | | | | 0 |
| 21 | | | | | | | | | | | | | | | 0 |

FIG. 4

| | AK | AL | AM | AN | AO | AP | AQ | AR | AS | AT |
|---|---|---|---|---|---|---|---|---|---|---|
| 1 | | | | | | | | | | |
| 2 | | | | | | | | | | |
| 3 | | | | | | | | | | |
| 4 | | | | | | | | | | |
| 5 | | | | | | | | | | |
| 6 | | | | | | | | | | |
| 7 | | | | | | | | | | |
| 8 | | | | | | | | | | |
| 9 | | | | | | | | | | |
| 10 | CRITICALITY | | | COMPLEXITY | | | | | | |
| 11 | Business Criticality (1 to 5) | Operational Criticality (1 to 5) Interfaces | | Code Complexity (1 to 5) | Data Complexity (1 to 5) | Business Complexity (1 to 5) | Problem Complexity (1 to 5) | Stability (1 to 5) | Application Complexity Score | Complexity Rating |
| 12 | 4 | 3 | | 5 | 3 | 2 | 3 | 1 | 14 | 3 |
| 13 | 4 | 3 | | 5 | 2 | 2 | 3 | 1 | 13 | 3 |
| 14 | 4 | 3 | | 3 | 3 | 2 | 3 | 1 | 12 | 3 |
| 15 | 4 | 3 | | 2 | 1 | 2 | 3 | 1 | 11 | 3 |
| 16 | 3 | 3 | | 1 | | 2 | 3 | 1 | 9 | 2 |
| 17 | 2 | 3 | | 2 | | 2 | 3 | 1 | 8 | 2 |
| 18 | 5 | 5 | | 2 | 5 | 2 | 3 | 5 | 17 | 4 |
| 19 | | | | | | | | | Check Data | Check Data |
| 20 | | | | | | | | | Check Data | Check Data |
| 21 | | | | | | | | | Check Data | Check Data |

*FIG. 5*

| | AV | AW | AX | AY | AZ | BA | BB | BC | BD | BE | BF | BG | BH | BI |
|---|---|---|---|---|---|---|---|---|---|---|---|---|---|---|
| 1 | | | | | | | | | | | | | | |
| 2 | | | | | | | | | | | | | | |
| 3 | | | | | | | | | | | | | | |
| 4 | | | | | | | | | | | | | | |
| 5 | | | | | | | | | | | | | | |
| 6 | | | | | | | | | | | | | | |
| 7 | | | | | | | | | | | | | | |
| 8 | | | | | | | | | | | | | | |
| 9 | | | | | | | | | | | | | | |
| 10 | | | | | | | APPLICATION PROFILE | | | | | | | |
| 11 | Number of Concurrent Users | LOC or Modules | Number of Sev 1 reports per month | Number of Sev 2 reports per month | Number of Maj/Minor Releases per month | Maj/Minor Releases Effort (FTEs/Hours) | Level of Customization | Concurrent Users Score | LOC or Modules Score | Sev 1 Score | Sev 2 Score | Major/Minor Release Score | Application Profile Score | Application Profile Rating |
| 12 | 99 | 500 | 10 | 50 | 2 | 100 | 3 | 3 | 1 | 1 | 2 | 1 | 11 | 2 |
| 13 | 20 | 10000 | 1 | 50 | 2 | 100 | 5 | 1 | 3 | 1 | 2 | 1 | 13 | 3 |
| 14 | 20 | 99999 | 10 | 5 | 2 | 300 | 3 | 1 | 4 | 1 | 1 | 1 | 11 | 2 |
| 15 | 50 | 500 | 10 | 200 | 2 | 100 | 3 | 3 | 1 | 1 | 4 | 1 | 13 | 3 |
| 16 | 200 | 500 | 10 | 5 | 2 | 300 | 5 | 4 | 1 | 1 | 1 | 2 | 11 | 2 |
| 17 | 20 | 500 | 10 | 500 | 55 | 100 | 3 | 1 | 1 | 1 | 4 | 1 | 14 | 3 |
| 18 | 300 | 200000 | 10 | 5 | 2 | 100 | | 5 | 4 | 1 | 1 | 1 | 15 | 3 |
| 19 | | | | | | | | 1 | 1 | 1 | 1 | 1 | Check Data | Check Data |
| 20 | | | | | | | | | 1 | 1 | 1 | 1 | Check Data | Check Data |
| 21 | | | | | | | | 1 | 1 | 1 | 1 | 1 | Check Data | Check Data |

| | BK | BL | BM | BN | BO | BP | BQ | BR | BS | BT | BU | BV |
|---|---|---|---|---|---|---|---|---|---|---|---|---|
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | Documentation Score Weightings: | | | | | 100% | | Assessment Score Weightings: | | | 100% |
| 9 | 25% | 15% | 10% | 5% | 20% | 15% | 10% | | 35% | 25% | 30% | 10% |
| 10 | Documentation (1 to 5) | | | | | | | | RATINGS AS SCORES | | | |
| 11 | Functional Design | Detail Design | Int/Reg Test Plans | User Manuals | Installation Guide | Data Dictionary | Training Manuals | | Business Criticality Score | Operational Criticality Score | Application Complexity Score | Application Profile Score |
| 12 | 5 | 3 | 2 | 2 | 1 | 2 | 2 | | 14 | 7.5 | 9 | 2 |
| 13 | 4 | 2 | 4 | 5 | 3 | 4 | 5 | | 14 | 7.5 | 9 | 3 |
| 14 | 5 | 1 | 5 | 2 | 1 | 1 | 5 | | 14 | 7.5 | 9 | 2 |
| 15 | 5 | 3 | 4 | 4 | 3 | 4 | 3 | | 10.5 | 7.5 | 9 | 3 |
| 16 | 4 | 3 | 1 | 2 | 1 | 5 | 5 | | 7 | 7.5 | 6 | 2 |
| 17 | 5 | 1 | 4 | 3 | 5 | 4 | 1 | | 17.5 | 7.5 | 6 | 3 |
| 18 | 1 | 3 | 1 | 2 | | | 5 | | | 12.5 | 12 | 3 |
| 19 | | | | | | | | | Check Data | Check Data | Check Data | Check Data |
| 20 | | | | | | | | | Check Data | Check Data | Check Data | Check Data |
| 21 | | | | | | | | | Check Data | Check Data | Check Data | Check Data |

|   | BX | BY | BZ | CA | CB | CC | CD | CE | CF | CG | CH |
|---|---|---|---|---|---|---|---|---|---|---|---|
| 1 | | | | | | | | | | | |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | Totals: | | | | Totals: | | |
| 9 | | | | | 45 | 237 | 0 | | 1 | 6 | 0 |
| 10 | MIGRATION ASSESSMENT | | | | FTE Distribution | | | | Application Distribution | | |
| 11 | Tool Results/ Recommendation | Application Assessment Score | Documentation Score | IBM Team Model Assessment/Override (Local, Mixed, Remote, N/A) | Onsite FTE | Onsite/ remote FTE | Remote FTE | | Onsite Apps | Onsite/ remote Apps | Remote Apps |
| 12 | Onsite/Remote | 32.5 | 27 | N/A | 0 | 55 | 0 | | 0 | 1 | 0 |
| 13 | Onsite/Remote | 33.5 | 36.5 | N/A | 0 | 27 | 0 | | 0 | 1 | 0 |
| 14 | Onsite/Remote | 32.5 | 28.5 | N/A | 0 | 77 | 0 | | 0 | 1 | 0 |
| 15 | Onsite/Remote | 33.5 | 29.5 | N/A | 0 | 33 | 0 | | 0 | 1 | 0 |
| 16 | Onsite/Remote | 26 | 33.5 | N/A | 0 | 30 | 0 | | 0 | 1 | 0 |
| 17 | Onsite/Remote | 23.5 | 30 | N/A | 0 | 15 | 0 | | 0 | 0 | 0 |
| 18 | CriticalApp & Unstable | 45 | 30 | N/A | 45 | 0 | 0 | | 1 | 0 | 0 |
| 19 | Onsite | Check Data | Check Data | N/A | 0 | 0 | 0 | | 0 | 0 | 0 |
| 20 | Onsite | Check Data | Check Data | N/A | 0 | 0 | 0 | | 0 | 0 | 0 |
| 21 | Onsite | Check Data | Check Data | N/A | 0 | 0 | 0 | | 0 | 0 | 0 |

*FIG. 8*

| Cell | Formula |
| --- | --- |
| AD12 | =SUM(U12:AC12) |
| AI12 | =SUM(AF12:AH12) |
| AS12 | =+IF(AND(AN12>=1,AN12<=5,AO12>=1,AO12<=5,AP12>=1,AP12<=5, AQ12>=1,AQ12<=5,AR12>=1,AR12<=5),SUM(AN12:AR12) ,"Check Data") |
| AT12 | =IF(AS12=0,"Check Data",IF(AS12<6,1,IF(AS12<11,2(IF(AS12<16,3, IF(AS12<21,4, IF(AS12<25,"Check Data",5)))))) |
| BC12 | =IF(AV12<=0,1,IF(AV12>=Controls!$B$10,LOOKUP(AV12, Concurrent_Users,User_Score),1)) |
| BD12 | =IF(AW12<=0,1,IF(AW12>=Controls!$B$3,LOOKUP(AW12,Codelines, Codelines_Score),1)) |
| BE12 | =IF(AX12<=0,1,IF(AX12>=Controls!$B$17,LOOKUP(AX12,Sev_1, Sev_1_Score),1)) |
| BF12 | =IF(AY12<=0,1,IF(AY12>=Controls!$B$24,LOOKUP(AY12,Sev_2, Sev_2_Score),1)) |
| BG12 | =IF(AZ12<=0,1,IF(AZ12>=Controls!$B$31,LOOKUP(AZ12, Maj_Minor_Rels,Maj_Minor_Rels_Score),1)) |
| BH12 | =+IF(AND(BB12>=1,BB12<=5,BC12>=1,BC12<=5,BD12>=1,BD12<=5, BE12>=1,BE12<=5,BF12>=1,BF12<=5,BG12>=1,BG12<=5), SUM(BB12:BG12) ,"Check Data") |
| BI12 | =IF(BH12=0,"Check Data", IF(BH12<7,1,IF(BH12<13,2,IF(BH12<19,3, IF(BH12<25,4,IF(BH12<30,"Check Data", 5)))))) |

FIG. 9

| Cell | Formula |
|---|---|
| BS12 | =+IF(AND(AK12>=1,AK12<=5),(+$BS$9*AK12)*10,"Check Data") |
| BT12 | =+IF(AND(AL12>=1,AL12<=5),(+$BT$9*AL12)*10,"Check Data") |
| BU12 | =+IF(AND(AT12>=1,AT12<=5),(+$BU$9*AT12)*10,"Check Data") |
| BV12 | =+IF(AND(BI12>=1,BI12<=5),(+$BV$9*BI12)*10,"Check Data") |
| BX12 | =IF(OR(CA12="Onsite",CA12="Mixed",CA12="Remote"), "See Override",IF(AND(S12>=1,S12<=$S$9),"Sunet",IF(AK12=5=AND (AR12<4)=AND(Z12<$Z$9),"Critical-Stable-Low Facing",IF (AND(AK12=5,AR12>3),"CriticalApp & Unstable",IF(Z12>=$Z$9, "High Facing",IF(BY12>40,"Onsite",IF(BY12<=10,"Remote", IF(BY12>=11,"Onsite/Remote","Check Data")))))))) |
| BY12 | =+IF(AND(SUM(BS12:BV12)>=10,SUM(BS12:BV12)<=50), SUM(BS12:BV12),"Check Data") |
| BZ12 | =+IF(AND(BK12>=1,BK12<=5,BL12>=1,BL12<=5,BM12>=1,BM12<=5, BN12>=1,BN12<=5,BO12>=1,BO12<=5,BP12>=1,BP12<=5,BQ12>=1, BQ12<=5),((($BK$9*BK12)+($BL$9*BL12)+($BN$9*BN12)+ ($BO$9*BO12)+($BP$9*BP12)+($BQ$9*BQ12))*10),"Check Data") |
| CB12 | =IF(SUM(CG12:CH12)=0,AI12,0) |
| CC12 | =+IF(OR(CA12="Mixed",BX12="Critical-Stable-Low Facing", BX12="Onsite/Remote"), AI12,0) |
| CD12 | =+IF(CA12="Remote",AI12,IF(BX12="Remote",1,0)) |
| CF12 | =+IF(SUM(CG12:CH12)=0,1,0) |
| CG12 | =IF(OR(CA12="Mixed",BX12="Critical-Stable-Low Facing", BX12="Onsite/Remote"), 1,0) |
| CH12 | =+IF(CA12="Remote",1,IF(BX12="Remote",1,0)) |

*FIG. 10*

| Business Area | Application Count | Application Assessment Score (average) | Documentation Score (average) | Total FTEs |
|---|---|---|---|---|
| Logistics | 2 | 24.75 | 31.75 | 45 |
| Finance | 2 | 33 | 31.75 | 82 |
| HR | 2 | 33 | 29 | 110 |
| Payroll | 1 | 45 | 30 | 45 |
| Total | 7 | 32.36 | 30.71 | 282 |

*FIG. 11*

| Business Area | Partition # | Duration Months | Application Count | Application Assessment Score (average) | Documentation Score (average) | Total FTEs | Local Percent | Remote Percent | Local FTEs | Remote FTEs |
|---|---|---|---|---|---|---|---|---|---|---|
| Migrated Applications | | | | | | | | | | |
| Logistics | 1 | 3 | 2 | 24.75 | 31.75 | 45 | 20% | 80% | 9 | 36 |
| Finance | 2 | 4 | 2 | 33 | 31.75 | 82 | 20% | 80% | 16.4 | 65.6 |
| HR | 3 | 5 | 2 | 33 | 29 | 110 | 20% | 80% | 22 | 88 |
| Subtotal | | | 6 | | | 237 | | | 47.4 | 189.6 |
| Non-migrated Applications (Local model or BAU) | | | | | | | | | | |
| Payroll | | | 1 | 45 | 30 | 45 | N/A | N/A | N/A | N/A |
| Grand Total | | | 7 | | | 282 | | | | |

*FIG. 12*

| Business Area | Partition # | Number of Applications in Partition | Application Assessment Score (average) | Documentation Score (average) | Total FTEs in Partition | Month 1 | Month 2 | Month 3 | Month 4 | Month 5 | Month 6 | Month 7 | Month 8 | Month 9 |
|---|---|---|---|---|---|---|---|---|---|---|---|---|---|---|
| Overall Migration Planning | | | | | | | | | | | | | | |
| Logistics | 1 | 2 | 24.75 | 31.75 | 45 | | PLAN | KT | PARALLEL | SS | | | | |
| Finance | 2 | 2 | 33 | 31.75 | 82 | | | PLAN | KT | PARALLEL | SS | | |
| HR | 3 | 2 | 33 | 29 | 110 | | | | PLAN | KT | PARALLEL | SS | |
| Total | | 6 | 32.36 | 30.71 | 237 | | | | | | | | | |

| Application Assessment Factor | Weighting | Description |
|---|---|---|
| Business criticality | 35% | A measure of the application's capability to cause financial, legal, regulatory, or relationship damage through non-availability. An additional measure is the impact to delivery of products or services. |
| Operational criticality | 25% | |
| Application complexity | 30% | A measure of the code, data, problem complexity |
| Application profile | 10% | A measure of the number of users and interfaces impacted due to non-availability of an application. |
| Other Factors | 0% | General measures not included above that are key in evaluating an application. |

FIG. 15

| Delivery Model 6 | Remote | Local/Remote | | | Local |
|---|---|---|---|---|---|
| Application Assessment Score ⇒ | 1-9 | 10-20 | 21-35 | 36-45 | 46-50 |
| Suitability For Model ⇒ | Most likely | Very good | Good | Likely | More likely |
| Expected % of Applications ⇒ | < 5% | 65 to 70% | | | 30% |

FIG. 16

| AS | AT |
|---|---|
| >25 | error |
| 21-25 | 5 |
| 16-20 | 4 |
| 11-15 | 3 |
| 6-10 | 2 |
| 1-5 | 1 |

FIG. 17

| BH | BI |
|---|---|
| >30 | error |
| 25-30 | 5 |
| 19-24 | 4 |
| 13-18 | 3 |
| 7-12 | 2 |
| 1-6 | 1 |

FIG. 18

| Documentation Factor | Weighting | Description |
|---|---|---|
| Functional Design Manual | 25% | Documents the functionality of the application (i.e., the functional tasks that the software is designed to perform) |
| Detail Design Manual | 15% | Documents the software design for the application (i.e., flow charts, basic assumptions, equations, etc.) |
| Int/Reg Test Plans | 10% | Documents procedures for debugging the software and standard test cases to be run for software verification |
| User Manuals | 5% | Documents how to use the software (i.e., how to run the application; required inuts and their format, etc.) |
| Installation Guide | 20% | Documents how to install the application on the user's computer system |
| Data Dictionary | 15% | Documents data ranges for variables of interest (e.g., input variables, output variables, internally computed variables, etc.) |
| Training Manuals | 10% | Documents procedures for training users |

FIG. 19

| Documentation Score ⇒ | 1-9 | 10-20 | 21-30 | 31-40 | 41-50 |
|---|---|---|---|---|---|
| Availability of the Documentation ⇒ | Limited availability | Mostly available | Fairly available | Available | Very available |

FIG. 20

| Local/Remote % | Guidelines |
|---|---|
| 20/80 | • Applications seeking low level of facing time<br>• Stable applications<br>• Sufficient FTE mass to support model<br>• Low level of interfaces<br>• Contains higher ratio of retained staff<br>• Low business criticality and service levels |
| 30/70 | • Applications requiring greater levels of facing time (i.e., consultation, vendor supported applications, manageable level of real-time support functions)<br>• Less stable applications<br>• Sufficient FTE mass to support model<br>• Medium level of interfaces<br>• Low, medium, and high business criticality applications with proven history of stability |
| >30/balance remote | • Applications requiring a higher level of facing time (i.e., functional consulting, early development phases, volatile applications, or real-time support needs)<br>• Package build and implement (on-going support can be more aggressive)<br>• Insufficient FTE mass to support model and cannot be logically grouped<br>• High level of interfaces<br>• High business criticality and service levels with proven history of stability |

|   | A B | Lines of Code or Modules | C Score |
|---|---|---|---|
| 1 | *Description* | | |
| 2 | Thresholds for Application Size - Lines of Code or Function Points | | |
| 3 | Small size application if up to - | 500 | 1 |
| 4 | Medium Small size application if up to - | 5000 | 2 |
| 5 | Medium size application if up to - | 10000 | 3 |
| 6 | Medium Large size application if up to - | 50000 | 4 |
| 7 | Large size application if up | 1000000 | 5 |
| 8 | | | |
| 9 | *Thresholds for Concurrent User Number* | Concurrent Users | Score |
| 10 | Small size application if up to - | 10 | 1 |
| 11 | Medium Small size application if up to - | 25 | 2 |
| 12 | Medium size application if up to - | 50 | 3 |
| 13 | Medium Large size application if up to - | 100 | 4 |
| 14 | Large size application if up | 300 | 5 |
| 15 | | | |
| 16 | *Thresholds for Incidents or Fault Reports Severity 1* | Sev 1 | Score |
| 17 | Small size application if up to - | 10 | 1 |
| 18 | Medium Small size application if up to - | 25 | 2 |
| 19 | Medium size application if up to - | 50 | 3 |
| 20 | Medium Large size application if up to - | 100 | 4 |
| 21 | Large size application if up | 300 | 5 |
| 22 | | | |
| 23 | *Thresholds for Incidents or Fault Reports Severity 2* | Sev 2 | Score |
| 24 | Small size application if up to - | 20 | 1 |
| 25 | Medium Small size application if up to - | 50 | 2 |
| 26 | Medium size application if up to - | 100 | 3 |
| 27 | Medium Large size application if up to - | 200 | 4 |
| 28 | Large size application if up | 600 | 5 |
| 29 | | | |
| 30 | *Thresholds for Major/Minor Releases* | Maj/Minor Rels | Score |
| 31 | Small size application if up to - | 20 | 1 |
| 32 | Medium Small size application if up to - | 40 | 2 |
| 33 | Medium size application if up to - | 60 | 3 |
| 34 | Medium Large size application if up to - | 80 | 4 |
| 35 | Large size application if up | 100 | 5 |

| | A | B | C |
|---|---|---|---|
| 1 | The Fields and Values | | |
| 2 | *Worksheet Section/Field* | *Description* | *Guidance/Examples* |
| 3 | BUSINESS | | |
| 4 | Business Area | Business Unit | Accounting, Logistics |
| 5 | Business Function | Department name or application team | AR, AP, Shipping |
| 6 | APPLICATIONS | | |
| 7 | Application ID | Count / line number | Automatically created |
| 8 | Application Name | Name of application | |
| 9 | Application Description | Description of application | |
| 10 | | | |
| 11 | APPLICATION ARCHITECTURE | | |
| 12 | Hardware | Hardware profile | IBM RS6000, MVS, Sun |
| 13 | Operating System | Operating systems | Linux, Windows 2000, OS/2 |
| 14 | Database | Database software used | DB2, Oracle, Sybase |
| 15 | Language | Programming languages used | COBOL, Visual Basic, C++ |
| 16 | Package Flag | Package Identifier | Y or N |
| 17 | Package Vendor | Vendor Name | |
| 18 | Age of Application | How old – in years – is the application | Number |
| 19 | Blank Custom 1 to 4 | Customizable fields (account specific) | |
| 20 | Life Expectancy | End of life (in months) from assessment date. | Number |

|    | A | B | C |
|----|---|---|---|
| 21 | FTE ANALYSIS | | |
| 22 | % of FTE Doing Break/Fix | Break/fix maintenance required to keep the application running and all associated tasks. | Percentage |
| 23 | % of FTE Doing Enhancements | Minor code changes required to provide operational and business continuity or changes that allow new functionality. Usually less than 2 months duration. | Percentage |
| 24 | % of FTE Doing Ad hoc Support | Ad hoc reporting or activities | Percentage |
| 25 | % of FTE Doing Testing | All testing, environmental builds, test case tracking, and/or data prep. | Percentage |
| 26 | % of FTE Doing Rollout | Production installation or stabilization | Percentage |
| 27 | % of FTE Doing Customer Facing | Time spent with client/users of system | Percentage |
| 28 | % of FTE Doing Project Mgmt. | Planning, monitoring, executing, and controlling functions. | Percentage |
| 29 | % of FTE Doing Development | Major code changes. Typically investment funding is required. | Percentage |
| 30 | % of Other Activities | Other activities like Business Analyst, Architect, DBA Functions (physical/logical), Training | |
| 31 | Total of %'s | Total of all percentages | Automatically summed |
| 32 | Location | Resource location | |
| 33 | Team size with over 6 years Exp. | Team Experience | Number |
| 34 | Team size with 3 to 6 years Exp. | Team Experience | Number |
| 35 | Team size with 0 to less than 3 years Exp. | Team Experience | Number |
| 36 | Total FTEs | Total FTES for all experience levels | Automatically summed |

*FIG. 23B*

| | A | B | C |
|---|---|---|---|
| 37 | CRITICALITY | | |
| 38 | Business Criticality | Business criticality of system | 5 = Statutory - required for regulatory purposes or Critical - business (enterprise) stops if system stops<br>4 = High Importance - division stops if system stops<br>3 = Important - creates some business disruption or inconvenience, but operations continue<br>2 = Lower impact: system creates inconvenience, but workarounds possible<br>1 = No impact |
| 39 | Operational Criticality | Impact to interfacing systems (internal/external) or operational support | 5 = Critical to Operations / Major Impact to interfacing systems<br>4 = High Importance but workaround exist for the short-term<br>3 = Important - creates slight business disruption or inconvenience, but operations continue<br>2 = Lower impact<br>1 = No impact |

*FIG. 23C*

|   | A | B | C |
|---|---|---|---|
| 40 | Complexity |  | Used for all:<br>5 - High complexity<br>4 - Medium-high<br>3 - Medium<br>2 - Medium-Low<br>1 - Low complexity |
| 41 | Code Complexity | Logic and Code complexity, assessment as determined by non-structured, complex logic, recursive calls, or highly advanced programming techniques in example |  |
| 42 | Data Complexity | Data and data relationship complexity (i.e., complex joins, nested SQLs, dynamic builds, etc.) |  |
| 43 | Business Complexity | Assessment of the Business rules/knowledge complexity, as required by the IT support team |  |
| 44 | Problem Complexity | Assessment of the level of complexity of the problems encountered by the IT team to-date. |  |
| 45 | Stability | Stability of the application | 5 - Highly unstable (outages occur daily)<br>3 - Mostly Stable (outages occur weekly)<br>1 - Very Stable (outages occur monthly, quarterly, or yearly) |

*FIG. 23D*

|    | A | B | C |
|----|---|---|---|
| 46 | APPLICATION PROFILE | | |
| 47 | Concurrent Users | Number of concurrent users | |
| 48 | LOC or Modules | Lines of code or count of modules | |
| 49 | Sev 1 Reports | Average number of monthly Sev 1 reports. Normally defined as system is down with major business impact | |
| 50 | Sev 2 Reports | Average number of monthly Sev 2 reports. Normally defined as system down but workaround exist or minor business impact. | |
| 51 | Major/Minor Releases | Average number of monthly releases/changes. | |
| 52 | Major/Minor Release Effort FTEs/Hours | Average monthly effort in hours or FTEs involved with each release/change. | |
| 53 | Level of Customization | Level of customization. An evaluation of intrusive code changes, screen, reports, and boltons. | 5 - Highly customized<br>4 - Boltons and some customization<br>3 - Medium customized<br>2 - Low customization<br>1 - no customization |
| 54 | | | |

*FIG. 23E*

| | A | B | C |
|---|---|---|---|
| 55 | DOCUMENTATION | | Used for all:<br>5 - Not available<br>4 - Mostly not available and not current<br>3 - Fairly available<br>2 - Available but over 1 year old<br>1 - Very available and current |
| 56 | Functional Designs | Defines high level functions of application | |
| 57 | Detail Designs | Defines in detail the logic of the application | |
| 58 | Int/Reg Test Plans | Test plans, cases, and expected results | |
| 59 | User Manuals | User manuals for customers of the system | |
| 60 | Installation Manuals | Technical manual on installing the system | |
| 61 | Data Dictionary | Data repository | |
| 62 | Training Manuals | Technical training materials | |
| 63 | | | |
| 64 | MIGRATION ASSESSMENT | | |
| 65 | Tool Results/Recommendation | Tool's quantitative assessment of the application and the appropriate action | |
| 66 | Application Assessment Score | A quantitative measure of the application's suitability for offshore/nearshore support. | |
| 67 | Documentation Score | A quantitative measure of the application's documentation availability and currency. | |
| 68 | IBM Team Model Assessment, Override | Subjective assessment of the application support strategy | |

*FIG. 23F*

SOFTWARE APPLICATION MANAGEMENT FOR DISTRIBUTING RESOURCES AND RESOURCE MODELING

The present invention is a continuation-in-part of U.S. patent application Ser. No. 10/635,086 which was filed on Aug. 6, 2003 now abandoned.

BACKGROUND OF THE INVENTION

1. Technical Field

The present invention relates to software application management for distributing resources relating to the software application.

2. Related Art

Some organizations have migrated software applications remotely, often resulting in higher quality development and maintenance of the software applications at lower costs. Moving a software application from local locations to remote locations is a complex task that may involve the replacement of an experienced with an equally capable staff who requires knowledge the software and the environment in which the software operates. Thus, there is a need for methodology and associated tool for managing the migration of the software application from local to remote locations.

SUMMARY OF THE INVENTION

The present invention provides a method for managing a plurality of software applications, comprising the steps of:

computing for each of said applications an application assessment score; and selecting a delivery model for each of said applications, said delivery model being selected from the group consisting of a Local model, a Remote model, and a Local-Remote model, said delivery model being selected as function of the application assessment score, said Local model, said Remote model, and said Local-Remote model each being relative to a local geographical area.

The present invention provides a computer program product, comprising:

a computer usable medium having a computer readable program code embodied therein for assessing and managing a plurality of software applications for remote migration, said computer readable program code adapted to execute the steps of:

computing for each of said applications an application assessment score; and selecting a delivery model for each of said applications, said delivery model being selected from the group consisting of a Local model, a Remote model, and a Local-Remote mode, said delivery model being selected as function of the application assessment score, said Local model, said Remote model, and said Local-Remote model each being relative to a local geographical area.

The present invention provides a methodology and associated tool for managing the migration of the software application from local to remote locations.

BRIEF DESCRIPTION OF THE DRAWINGS

FIGS. 2-8 depict an "Assessment" worksheet of a spreadsheet which performs an Application Assessment of FIG. 1, in accordance with embodiments of the present invention.

FIGS. 9-10 depict formulas used to calculate values of calculated fields of the spreadsheet of FIGS. 2-8, in accordance with embodiments of the present invention.

FIG. 11 is a table that lists partitions and groups derived from the spreadsheet of FIGS. 2-8, in accordance with embodiments of the present invention.

FIG. 12 is a table describing an ordering sequence for migration of the partitions listed in FIG. 11, in accordance with embodiments of the present invention.

FIG. 13 is a table showing a migration timeline relating to the ordering sequence in FIG. 12, in accordance with embodiments of the present invention.

FIG. 14 is a table describing the Application Assessment Factors in the spreadsheet of FIGS. 2-8, in accordance with embodiments of the present invention.

FIG. 15 is a table correlating a the delivery model with the Application Assessment Score, in accordance with embodiments of the present invention.

FIG. 16 is a table correlating the AT column with the AS column of the spreadsheet of FIGS. 2-8, in accordance with embodiments of the present invention.

FIG. 17 is a table correlating the BI column with the BH column of the spreadsheet of FIGS. 2-8, in accordance with embodiments of the present invention.

FIG. 18 is a table describing the Documentation Factors in the spreadsheet of FIGS. 2-8, in accordance with embodiments of the present invention.

FIG. 19 is a table the availability of documentation with the Documentation Score, in accordance with embodiments of the present invention.

FIG. 20 is a table providing guidelines for distributing a workforce between local and remote locations, in accordance with embodiments of the present invention.

FIG. 22 depicts a "Controls" worksheet of the spreadsheet of FIGS. 2-8 wherein the "Controls" worksheet includes tables for implementing a LOOKUP command, in accordance with embodiments of the present invention.

FIGS. 23A-23F depict a "Instructions" worksheet of the spreadsheet of FIGS. 2-8 wherein the "Instructions" worksheet provides instructions for entering data in the "Assessment" worksheet of FIGS. 2-8, in accordance with embodiments of the present invention.

DETAILED DESCRIPTION OF THE INVENTION

Definitions

Figure 1:
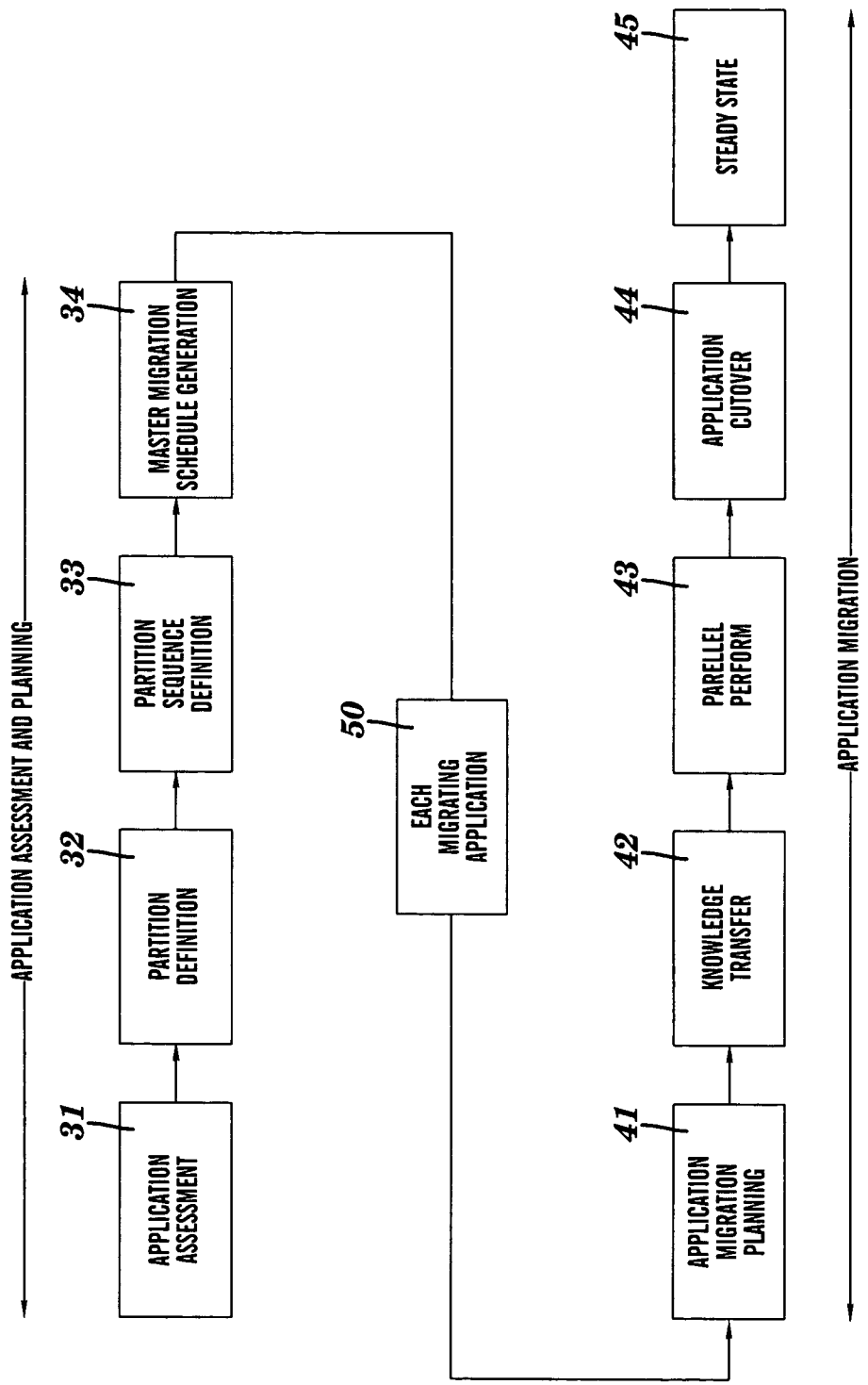
FIG. 1 is a flow chart describing an application assessment and migration procedure, in accordance with embodiments of the present invention.

An "application" or "software application" is a software application comprising any computer program software adapted to be stored on a computer usable medium and adapted to be executed on a computer processor. Examples of applications include, inter alia: system software (e.g., operating system software, input/output interface software, etc.); business application software (e.g., accounting software, product inventory software, human resources software, product tracking software, equipment inventory software, client database software, etc.); engineering software (plant operations software, acoustics and vibrations software, structural analysis software, nuclear reactor physics software, etc.); mathematics software (e.g., statistical analysis software, graphics software, linear analysis software, etc.). The terms "application" and "software application" will be used interchangeably and are assumed to have an identical meaning herein.

"Local" pertains to land within a local geographical area that consists of at least one country. Examples of local geographical areas include, inter alia, United States, United States and Canada, Czech Republic and Slovakia and Hungary, etc.). Thus, a local geographical area may consist of one country (e.g., United States), a plurality of countries, etc. The local geographical area of United States and Canada is an example of local geographical area consisting of a plurality of North America Free Trade Agreement (NAFTA) countries. The local geographical area of Czech Republic and Slovakia and Hungary is an example of local geographical area consisting of a plurality of European Union (EU) countries. As examples of "local", Illinois and Alaska are local for an embodiment in which the local geographical area consists of the United States. If the local geographical area consists of one country (i.e., no less and no more than one country), then the "local" land within the one country is called "onshore" land within the one country. For example, land within the United States is an example of "onshore" land within the United States for an embodiment in which the local geographical area consists of the United States. As another example, land within Canada is an example of "onshore" land within Canada for an embodiment in which the local geographical area consists of Canada.

"Remote" pertains to land external to (i.e., outside of) the local geographical area, including land having a border in common with an exterior border of the local geographical area. For example, Mexico and India are remote if the local geographical area consists of the United States. If the local geographical area consists of one country, then the "remote" land outside of the one country is called "offshore" land outside of the one country. For example, if the local geographical area consists of United States, then the remote land may consist of Brazil. As another example, if the local geographical area consists of Spain, then the remote land may consist of India.

"Adjoining" is a special case of "remote" and pertains to land outside of the local geographical area wherein said land has a border in common with an exterior border of the local geographical area. For example, Mexico is adjoining for an embodiment in which the local geographical area consists of the United States. As another example, Romania is adjoining for an embodiment in which the local geographical area consists of Czech Republic and Slovakia and Hungary. "Nearshore" is synonymous with, and thus has the same definition as, "Adjoining".

Introduction

The present invention determines what applications are most appropriate for moving remote and what applications are least appropriate for moving remote. Thus, "moving remote" means moving to a remote geographical area that is outside of the local geographical area.

The present invention provides a methodology for geographically positioning/delivering a software application in accordance with one of three delivery models: a Local model, a Local-Remote model, or a Remote model, each model being relative to a local geographical area. As explained supra, the local geographical area consists of at least one country. Thus the local geographical area may consist of one, inter alia, country, a plurality of countries, a first country and additional land external to the one country, etc.

With the Local model all workforce resources (i.e., people constituting the local team) are to be located locally (i.e., in a same local geographical area) and all functional (i.e., high level designs, high level work effort estimates, requirements, user testing support, etc.) and detailed tasks (i.e., detailed level tasks like coding, unit testing, detailed sizing/designs, etc.) will be performed by the local team. With the Remote model all workforce resources are to be located remotely (i.e., in a geographical area that is external to the local geographical area) and all functional and detailed tasks will be performed by the remote team. The Local-Remote model separates functional and detailed tasks between the local and remote teams. With the Local-Remote model, a first portion of the team is local within the local geographical area (e.g., United States) and a second portion of the team is remote (e.g., in India). For example, 20% of the team may be located in the United States, and 80% of the team may be located in India. The two portions of the team work together to collectively support the application. Each delivery model has a unique set of characteristics that will help identify the remote-suitability of applications.

The Local model is appropriate for an application that: is highly volatile, is unstable, has legal or export restrictions, requires real-time support, requires a high level of customer interaction, requires high interfacing with other resources, is written with proprietary or third party software with limitations for moving support remotely (i.e to Remote locations), has stringent security requirements, and/or has little or no return-on-investment potential due to "sunset" (i.e., scheduled to be retired shortly such as 18 months or less).

The Remote model is appropriate for an application that: is very stable, is highly autonomous, has a well-defined scope, follows well-defined requirements, requires few customer interactions, is supported by contractors, and/or has a planned sunset date of less than 18 months such that a return on investment is expected to be realized within this 18-month period.

The Local-Remote model is appropriate for an application that: is stable (including business critical applications that have been stabilized), has a well defined scope, follows well-defined requirements, is supported by a staff that is geographically distributed and works from remote locations, requires high interfacing with other resources such that the interfacing application support will move jointly to remote locations and there is no dependency on restricted production data or support, is supported by a high number of contractors, and/or has a planned sunset date of less than 18 months such that a return on investment is expected to be realized within this 18-month period.

FIG. 1 is a flow chart describing an application assessment and migration procedure, in accordance with embodiments of the present invention. FIG. 1 depicts a first phase for determining candidate applications for remote migration, followed by a second phase for implementing the migration for each such candidate application. The first phase in FIG. 1 (i.e., Application Assessment and Planning) comprises the sequential processes of: Application Assessment 31, Partition Definition 32, Partition Sequence Definition 33, and Master Migration Schedule Generation 34.

The Application Assessment 31 performs an application assessment for each application that results in an application assessment score (e.g., from 1 to 50), and based on said application assessment score the Application Assessment 31 determines which of the three delivery models (i.e., Local, Remote, or Local-Remote model) is appropriate for the application so assessed.

The Partition Definition 32 partitions the assessed applications into logical groupings (or "partitions") such that each logical grouping can be moved from local to remote as a unit of work. The logical groupings may be based on business area, business function, technology area, etc. The logical groupings may be further refined to balance the mix of applications based on business criticality, business complexity, and staffing distribution.

The Partition Sequence Definition 33 sequences the logical groupings for migration of from local to remote in a manner that minimally impacts the business. The partitions are sequenced such that partitions with a low average application assessment score (to be explained infra in conjunction with FIG. 11), high stability, and low to medium complexity are to be moved first. Factors to be considered in the sequencing include: business, technical, resource, and project dependencies. The sequencing may be further refined by reviewing overall partition criticality and support levels.

The Master Migration Schedule Generation 34 generates a Master Migration Schedule (see FIG. 13 for an example) for implementing the group migrations sequenced by the Partition Sequence Definition 33. Generating the Master Migration Schedule may include: defining the time scope of the migration timeline, defining the overall migration strategy, identifying and planning for project dependencies and risks, developing individual partition schedules, and scheduling guidelines for each partition (typically 4 to 5 months for migration in functional steps of multiples of one month).

The second phase (i.e, Application Migration) in FIG. 1 comprises, for each migrating application 50, the sequential processes of: Application Migration Planning 41, Knowledge Transfer 42, Parallel Perform 43, Application Cutover 44, and Steady State 45.

The Application Migration Planning 41 takes into account the resource requirements, what tasks have to be performed, etc., in order to subsequently transfer knowledge about the application from local to remote.

The Knowledge transfer 42 occurs during a period in which the application team goes through, inter alia: classroom training for supporting the applications and/or guided performance training.

The Parallel Perform 43 includes a period of time during which the new remote team of people perform the application and if the remote team run into trouble, the previous team that existed just prior to the onset of the remote team is adapted to assist and help the remote team.

The Application Cutover 44 is an interface between the Parallel Perform 43 and the Steady State 45.

The Steady State 45 is characterized by local and remote teams being in place such that the remote team is running and the application is being managed autonomously by the remote team.

The Application Assessment and Planning phase of FIG. 1 will be next discussed, with respect to: Application Assessment 31, Partition Definition 32, Partition Sequence Definition 33, and Master Migration Schedule Generation 34. The scope of the present invention includes implementing each of Application Assessment 31, Partition Definition 32, Partition Sequence Definition 33, and Master Migration Schedule Generation 34 by execution of computer readable program code embodied in a computer usable medium.

Application Assessment

In relation to Application Assessment 11 of FIG. 1, each application is assessed based on Application Assessment Factors, comprising: business criticality, operational criticality, application complexity, application profile, and other factors. The Application Assessment Factors are weighted to place greater importance on those factors having a higher business focus. FIG. 14 depicts a description of the Application Assessment Factors and their weightings.

The business criticality relates to the business as a whole; e.g., if the application is down then the business stops. In contrast, operational criticality relates to internal interfaces within the business; e.g., if the application is down then other applications may be impacted. The "Other Factors" category is a catch-all category and may include, inter alia, factors specific to an industry (e.g., certain billing software may be a critical issue for a telecommunications company; but billing may not be a material concern for other industries, so that for a telecommunication company billing software may be too critical to export to remote locations). Additionally, the weightings in FIG. 14 are for illustrative purposes only, and any set of weighting factors are within the scope of the present invention.

Each Application Assessment Factor is quantified and totaled to establish the application assessment score. In some embodiments, 65 to 70 percent of a client's application portfolio will fall within the Remote or Local-Remote delivery model, while 30 to 35 percent of the client's application portfolio will include key business/mission critical applications that will be supported with a Local delivery model.

FIG. 15, which is applicable to some embodiments of the present invention, lists ranges of the application assessment score of an application for providing guidance to determine the appropriate delivery model for the application. FIG. 15 depicts a range of "Application Assessment Score" for each delivery model, on a scale from 1 to 50. The "Expected % of Applications" is the estimated percent of applications expected to fall within each delivery model, and the listed percents in FIG. 5 are merely illustrative. The actual "Expected % of Applications" is case-dependent and will vary from one organization to another, or from one industry to another.

FIGS. 2-8 collectively depict an "Assessment" worksheet of an EXCEL® spreadsheet, wherein said "Assessment" worksheet performs the Application Assessment 31 of FIG. 1, in accordance with embodiments of the present invention. Each Figure of FIGS. 2-8 displays the same spreadsheet rows 1-21, wherein the row numbers 1-21 are shown in the leftmost column of each Figure. Of the rows 1-21, rows 12-18 each represent a single application, and rows 19-21 are essentially empty and therefore do not represent applications.

FIG. 22 depicts a "Controls" worksheet of the spreadsheet of FIGS. 2-8 wherein the "Controls" worksheet includes tables for implementing a LOOKUP command appearing in formulas for selected calculated fields of the "Assessment" worksheet, in accordance with embodiments of the present invention.

FIGS. 23A-23F (collectively, FIG. 23) depict a "Instructions" worksheet of the spreadsheet of FIGS. 2-8 wherein the "Instructions" worksheet provides instructions for entering data in the "Assessment" worksheet of FIGS. 2-8, in accordance with embodiments of the present invention.

FIGS. 2-8 each represent a different groups of columns of the "Assessment" worksheet of the spreadsheet, sequentially ordered from left to right. In particular, FIG. 2 depicts columns A to F, FIG. 3 depicts columns H to S, FIG. 4 depicts columns U to AI, FIG. 5 depicts columns AK to AT, FIG. 6 depicts columns AV to BI, FIG. 7 depicts columns BK to BV, and FIG. 8 depicts columns BX to CH.

Whenever the description herein infra of the "Assessment" worksheet of FIGS. 2-8 refers to the contents of a column but does not identify specific rows, it is to understood that the description is actually referring to the data content of the cells defined by the intersection of the column with rows 12, 13, 14, . . . .

FIG. 2 displays a legend in the cells defined by columns A-B and rows 3-7. The legend is applicable to each Figure of FIGS. 2-8. The legend identifies, by the indicated shading, which fields are enterable fields, which fields are calculated fields, and which fields contain control totals. A control total for a given column is calculated as a summation of all numerical values appearing in the cells of the given column.

The cells having calculated fields each include a calculated value (e.g., a numerical value, a text value, etc.) in accordance with the formulas listed in FIGS. 9-10, in accordance with embodiments of the present invention. The formulas in FIGS. 9-10 are expressed in accordance with the EXCEL® language for articulating formulas. While the formulas listed FIGS. 9-10 are particularized for row 12, said formulas of FIGS. 9-10 are applicable to any given row of rows 12, 13, 14, . . . , provided that the "12" is replaced by the row number of the given row.

FIG. 2 depicts the following information for each application: business area, business function, application ID, application name, and application description.

FIG. 3 depicts the following information for each application: hardware platform, software platform, database used by the application, application language, package flag (i.e., Y: off the shelf N: not off the shelf), package vendor, age, number of users supported, and life expectancy.

FIG. 4 includes columns which describe the distribution of full-time employees (FTE) by function/activity for each application. Columns U-AC of FIG. 4 lists the percentage of full-time employees (FTE) engaged in various functions/activities: percent of FTE doing break/fix of the software (i.e., percent of FTE devoted to repair/maintenance of the application), percent of FTE doing enhancements of the software, percent of FTE doing ad hoc support, percent of FTE doing testing, percent of FTE doing rollout (i.e., deployment), percent of FTE doing customer facing (i.e., customer interaction), percent of FTE doing project management, percent of FTE doing development, and percent of FTE doing other activities. The total of said percentages for each application are a calculated field in column AD (in rows 12, 13, 14, . . . ), which is computed by adding the cells in columns U through AC (see formula for AD12 in FIG. 9). Column AE lists the location of the application. Columns AF, AG, and AH indicate the number of FTEs (called "team size") having more than 6 years experience, 3 to 6 years experience, and less than three years experience, respectively. The total of said FTEs for each application is a calculated field in column AI (in rows 12, 13, 14, . . . ), which is computed by adding the cells in columns AE through AG (see formula for AI12 in FIG. 9).

FIG. 5 includes columns of data for computing three of the Application Assessment Factors required for the Application Assessment 31 of FIG. 1, namely: business criticality (column AK), operational criticality (column AL), and application complexity (columns AN-AR). The business criticality has a score from 1 to 5 in order of increasing business criticality. The operational criticality has a score from 1 to 5 in order of increasing operational criticality. The application complexity is broken down into five complexity components: code complexity (column AN), data complexity (column AO), business complexity (column AP), problem complexity (column AQ), and application stability (column AR). Each of said complexity components has a score from 1 to 5 in order of increasing complexity.

Column AS includes a calculated field (in rows 12, 13, 14, . . . ) that contains the Application Complexity Score for each application, by summing the scores of the complexity components. Thus, the Application Complexity Score is computed by adding the cells in columns AN through AR for each application (see formula for AS12 in FIG. 9).

Column AT includes a calculated field (in rows 12, 13, 14, . . . ) that contains the Complexity Rating for each application as indicated FIG. 16 in accordance with the formula for AT12 in FIG. 9. The Complexity Rating has a value of 1 to 5 in order of increasing Application Complexity Score.

FIG. 6 includes columns of data for computing the Application Profile factor of the Application Assessment Factors required for the Application Assessment 31 of FIG. 1. Columns AV, AW, AX, AY, AZ, BA, and BB respectively include: Number of concurrent users, Number of software modules (denoted as "LOC or Modules"), Number of Severity-1 reports per month, Number of Severity-2 reports per month, Number of major/minor releases per month, Major/minor Releases Effort in FTEs or total hours, and Level of customization (1 to 5 in order of increasing degree of customization).

A Severity-1 incident occurs if upon an application going down, one or more other applications are negatively impacted such as likewise going down. A Severity-2 incident occurs if upon an application going down, workarounds exists such that other applications are not impacted and do not consequently go down.

Columns BC-BI of FIG. 6 each include calculated fields (in rows 12, 13, 14, . . . ). Column BC includes the calculated field containing a "Concurrent User's Score" computed according to the function LOOKUP, based on the Number of Concurrent Users in column AV (see formula for BC12 in FIG. 9). The Concurrent User's Score in column BC is rated on a scale if 1 to 5 in order of increasing Number of Concurrent Users. Note that the function LOOKUP accesses data in the "Controls" worksheet of FIG. 22.

Column BD includes the calculated field containing a "LOC or Modules Score" computed according to the function LOOKUP, based on the LOCs or Modules in column AW (see formula for BD12 in FIG. 9). The LOC or Modules Score in column BD is rated on a scale if 1 to 5 in order of increasing LOCs or Modules.

Column BE includes the calculated field containing a Severity-1 Score computed according to the function LOOKUP, based on the Number of Severity-1 reports per month in column AX (see formula for BE12 in FIG. 9). The Severity-1 Score in column BE is rated on a scale if 1 to 5 in order of increasing Number of Severity-1 reports per month.

Column BF includes the calculated field containing a Severity-2 Score computed according to the function LOOKUP, based on the Number of Severity-2 reports per month in column AY (see formula for BF12 in FIG. 9). The Severity-2 Score in column BF is rated on a scale if 1 to 5 in order of increasing Number of Severity-2 reports per month.

Column BG includes the calculated field containing a Major/Minor Release Score computed according to the function LOOKUP, based on the Number of major/minor releases per month in column AZ (see formula for BG12 in FIG. 9). The Major/Minor Release Score in column BG is rated on a scale if 1 to 5 in order of increasing Number of major/minor releases per month.

Column BH includes the calculated field containing an Application Profile Score computed as a summation over the contents of the scores in columns BB to BG (see formula for BH12 in FIG. 9).

Column BI includes the calculated field containing an Application Profile Rating as indicated in FIG. 17 in accordance with the formula for BI12 in FIG. 9. The Application Profile Rating has a value of 1 to 5 in order of increasing Application Profile Rating.

FIG. 7 includes columns BS-BV, each containing calculated fields in rows 12, 13, 14, . . . , which comprise scores associated with the Application Assessment Factors of FIG. 14. Row 9 of columns BS-BV contain the weighting factors of FIG. 14. Some fields in FIG. 7 are calculated according to formulas depicted in FIG. 10, and "Onsite" in FIG. 10 is synonymous with "Local".

In FIG. 7, Column BS includes the calculated field containing a "Business Criticality Score" computed according to the product of the Business Criticality rating in column AK (see FIG. 5) and the applicable weight in cell BS9 (see formula for BS12 in FIG. 10).

Column BT includes the calculated field containing a "Operational Criticality Score" computed according to the product of the Operational Criticality rating in column AL (see FIG. 5) and the applicable weight in cell BT9 (see formula for BT12 in FIG. 10).

Column BU includes the calculated field containing a "Application Complexity Score" computed according to the product of the Complexity rating in column AT (see FIG. 5) and the applicable weight in cell BU9 (see formula for BU12 in FIG. 10).

Column BV includes the calculated field containing a "Application Profile Score" computed according to the product of the Application Profile rating in column BI (see FIG. 6) and the applicable weight in cell BV9 (see formula for BV12 in FIG. 10).

FIG. 8 includes columns having calculated fields and relating to completing the Application Assessment 31 of FIG. 1, namely columns BX, BY, CA, CB, CC, CD, CF, CG, and CH. In FIG. 8, "Onsite" is synonymous with "Local" and "Onsite/Remote" is synonymous with "Local/Remote".

Column BY is a calculated field containing the Application Assessment Score in rows, 12, 13, 14, . . . , calculated by adding scores associated with the Application Assessment Factors, said scores being in columns BS-BV of FIG. 7 (see formula for BY12 in FIG. 10). Thus the Application Assessment Score is computed in the presently described embodiment as a weighted linear function of the following variables: business criticality rating, the operational criticality rating, the application complexity rating, and the application profile rating. However, the scope of the present invention includes an embodiment in which the Application Assessment Score is computed as a weighted nonlinear function of the following variables: business criticality rating, the operational criticality rating, the application complexity rating, and the application profile rating (which means that the dependence on at least one of said variables in nonlinear). It should be noted that weighting of each variable (in either the linear or nonlinear embodiment) may be zero or non-zero; a weighting of zero for a given variable would make the Application Assessment Score independent of the given variable Column BX is a calculated field containing the delivery model for each application (in rows 12, 13, 14, . . . ). In column BX "Onsite" means "Local". The formula for determining the delivery model in column BX is given as the formula for calculating BX12 in FIG. 10. The features of this formula include:

1) BX is a function of the Application Assessment Score contained in column BY according to: BX="Onsite" if BY>40, BX="Remote" if BY≦10, and BX="Onsite/Remote" if 11≦BY≦40 (note that the preceding dependence of BX on BY differs from the dependence of BX on BY in FIG. 15 which is acceptable since the scope of the present invention does not constrain the dependence of BX on BY to a specific relationship);

2) The preceding calculation of BX in 1) above is subject to an override (i.e., a delivery model override) based other special conditions; e.g., BX="CriticalApp & Unstable" if AK=5 and AR>3 (Business Criticality rating=5 and Stability rating>3), which occurs in cell BX18; and 3) The preceding calculation of BX in 1) and 2) above is subject to another delivery model override, namely an override input in column CA.

Columns CF, CG, and CH are calculated fields collectively containing the delivery model for each application (in rows 12, 13, 14, . . . ), based on column BX with a further dependence on column CA (see formulas for CF12, CG12, and CH12 in FIG. 10). Note that "1" denotes that the associated delivery model is used for the application, and "0" denotes that the associated delivery model is not used for the application. For example, the "1" in cells CG12, CG13, CG14, CG16, and CG17 indicates that the application of rows 12-17 each have the Onsite/Remote delivery model, which is derived from the fact that the Onsite/Remote delivery model is contained in cells BX12-BX17. The "CriticalApp & Unstable" value in cell BX18 translates to the Onsite model in cell CF18.

Columns CB, CC, and CD are calculated fields containing the distribution of FTEs with respect to the Onsite, Onsite/Remote, and Remote delivery models. As may be seen in FIG. 8, the pattern of "0" and "1" in columns CF, CG, and CH is repeated in columns CB, CC, and CD, respectively, except that "1" is replaced by the total number of FTEs contained in column AI of FIG. 4 (see formula for CB12, CC12, and CD12 in FIG. 10).

Partition Definition

In relation to Partition Definition 32 of FIG. 1, a partition represents a group of applications that will migrate from local to remote together. FIG. 11 depicts the partitions, derived from column A of FIG. 2 on the basis of a common business area. Thus the partitions listed in FIG. 11 are: Logistics, Finance, and HR. Payroll is a grouping, but not a partition, but rather is a group of applications that will remain local, because Payroll is a Local grouping as indicated in cell CF18 of FIG. 8.

The partitions and groupings may alternatively be based on other criteria such as, inter alia, business function, technology area, team size (in terms of the number of FTEs), call volumes (i.e., helpdesk and non-helpdesk), internal and external dependencies, project activity, etc.

The Application Count is the number of applications in each business area as deduced from col. A of FIG. 2.

The average Application Assessment Score for each partition or grouping is the arithmetic average of the Application Assessment Scores for the applications in each partition or grouping, as listed in column BY of FIG. 8. For example, column A of FIG. 1 identifies the Logistics partition as relating to rows 16 and 17. Since the Application Assessment Scores for rows 16 and 17 are 26 and 23.5, respectively, the average Application Assessment Score for the Logistics partition is 24.75 (i.e., [26+23.5]/2). Note that the partitions are ordered (from top to bottom) in FIG. 11 by the average Application Assessment Score.

The Total FTEs for each partition is the summation of the FTEs of the applications in the partition, as derived from column AI of FIG. 4 (or from columns CB, CC, and CD of FIG. 8). For example, column A of FIG. 1 identifies the Finance partition as relating to rows 12 and 13. Since the FTEs for rows 12 and 13 are 55 and 27, respectively, the Total FTEs for the Finance partition is 82 (i.e., 55+27).

Partition Sequence Definition

In relation to Partition Sequence Definition 32 of FIG. 1, FIG. 12 lists the partitions of FIG. 11 in order of migration (from top to bottom) to remote. The duration of migration for each partition in FIG. 12 includes the following sequential processes of Application Migration depicted in FIG. 1: Application Migration Planning 41, Knowledge Transfer 42, and Parallel Perform 43. The duration of migration for each partition in FIG. 12 relates to factors such as, inter alia, an average Documentation Score (discussed infra), the size of the application (i.e., number of program modules or lines of code, etc.), application complexity, resource availability, etc. The order of migration in FIG. 12 relates to the order of average Application Assessment Score in FIG. 11 (listed again in FIG. 12) and also to the duration of migration for each partition. Consequently, the order of migration of the partitions may relate to the average Documentation Score through the dependence of the duration on the average Documentation Score.

As to the effect of the Application Assessment Score on the order of migration, the least critical and least complex applications should be migrated first, and the more critical and complex applications should be relatively later migrated. Additionally, the earlier and less complex applications can be migrated more quickly as reflected in the duration of 3, 4, and 5 months for the Logistics, Finance, and HR partitions respectively.

As to the effect of the average Documentation Score on the duration of migration of each partition, FIG. 7 of the spreadsheet includes Documentation Factors in columns BK-BQ, their scores for each application in rows 12, 13, 14, . . . , and their associated weights in row 9. The Documentation Factors are rated on a scale from 1 to 5 with the a rating of 1 being the lowest rating indicative of a low level of documentation, and a rating of 5 being the highest rating indicative of a high level of documentation. FIG. 18 provides a description of the Documentation Factors along with their associated weights. The weights in FIG. 18 are merely illustrative, and any set of weights may be used.

FIG. 8 includes column BZ which is a calculated field containing a Documentation Score in rows 12, 13, 14, . . . . The Documentation Score is a linear combination of the Documentation Factors in accordance with the weights, multiplied by 10 (see formula for BZ12 in FIG. 10). For example, the documentation factor for row 12 is 27 (i.e., 10×[0.25×5+ 0.15×3+0.10×2+0.05×2+0.20×1+0.15×2+0.10×2]).

FIGS. 11 and 12 each list the average Documentation Score for each partition and group, as averaged over the applications in each partition and group.

FIG. 19, which is applicable to some embodiments of the present invention, lists ranges of the documentation score of an application for providing guidance to determine the cycle length (i.e., months) for migrating applications to remote. Generally, the more available the documentation, the shorter the cycle length. A higher availability is associated with a higher Documentation Score.

Returning to FIG. 12, the order of migration is a function of the average Application Assessment Score and the average Documentation Score. As can be seen in FIG. 12, the Logistics partition (which has the lowest average Application Assessment Score and the highest average Documentation Score) will have the shortest migration duration of 3 months and be first to migrate to Remote, while the HR partition (which has the highest average Application Assessment Score and the lowest average Documentation Score) will have the longest migration duration of 5 months and be last to migrate to Remote. However, the order of migration may take into account other factors, such as life expectancy and dependencies (i.e., technical, people, and project dependencies).

FIG. 12 also shows "Local Percent" of 20% (i.e., the percent of FTEs placed locally) for each partition and the "Remote Percent" of 80% (i.e., percent of FTEs placed remotely for each partition). FIG. 12 also shows the Local FTEs (i.e., Local Percent×Total FTEs), and the Remote FTEs (i.e., Remote Percent×Total FTEs). The Local Percent of 20% and the Remote Percent of 80% is for illustrative purposes only. Generally, any combination of Local Percent and Remote Percent that sums to 100% is within the scope of the present invention. FIG. 20 lists various combinations of Local Percent and Remote Percent and the factors that favor each such combination.

Master Migration Schedule Generation

In relation to Master Migration Schedule Generation 34 of FIG. 1, FIG. 13 depicts a Master Migration Schedule, which includes a timeline for implementing the migration of applications to Remote. The timeline of FIG. 13 shows that the Logistics partition is migrated first, the Finance partition is next migrated, and the HR partition is migrated last. The preceding order of migration is in accordance with the order of migration discussed supra in conjunction with FIG. 12.

In the Month 1, Month 2, . . . portion of the timeline of FIG. 13, "PLAN" denotes Application Migration 41 depicted in FIG. 1, "KT" denotes Knowledge Transfer 42 depicted in FIG. 1, "PARALLEL" denotes Parallel Perform 43 depicted in FIG. 1, and "SS" denotes Steady State 45 depicted in FIG. 1.

To illustrate the timeline of FIG. 13, consider the Finance partition. In accordance with the second phase of FIG. 1 (i.e., Application Migration), FIG. 13 shows that: month 3 is devoted to the Application Migration Planning 41 (i.e., "PLAN"), months 4 and 5 are devoted to Knowledge Transfer 42 (i.e., "KT"), and month 6 is devoted to Parallel Perform 43 (i.e., "PARALLEL") for a duration of 4 months. The Finance partition is in Steady State 45 in month 7, and the Application Cutover 44 is at the interface between the end of month 6 and the beginning of month 7. The Logistics and HR partitions have similar timelines in FIG. 13.

Additional Aspects of the Invention

While an EXCEL® spreadsheet was described herein for computing for each application an application assessment score and a documentation score (as well as related parameters such as assigning FTEs to a delivery model for each application), the scope of the present invention includes any commercial or non-commercial spreadsheet capable of having calculated fields with associated calculational formulas. The scope of the present invention more generally includes any known software computing means for performing any of the calculations and logic that was described herein as being performed in accordance with said spreadsheet. Such software computing means may include, inter alia, a spreadsheet as discussed supra or a computer program written in any applicable computer programming language such as C, C++, BASIC, FORTRAN, PASCAL, etc.

Figure 21:
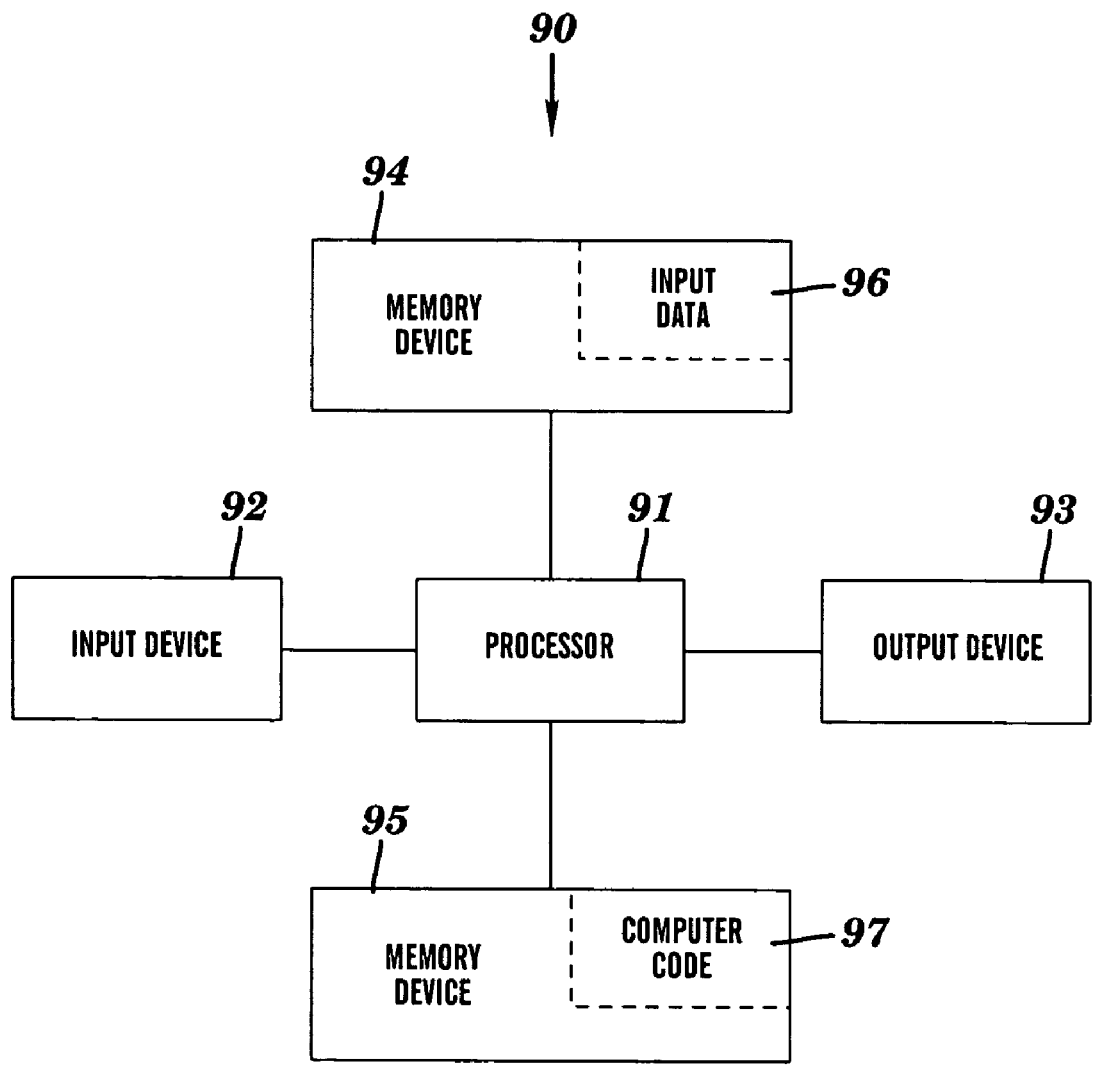
FIG. 21 illustrates a computer system for assessing and managing a plurality of software applications for remote migration, in accordance with embodiments of the present invention.

FIG. 21 illustrates a computer system 90 for assessing and managing a plurality of software applications for remote migration, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes a computer code 97 (i.e., computer readable program code). The computer code 97 may be embodied in a spreadsheet having calculated fields with associated calculational formulas, such as the EXCEL® spreadsheet discussed supra in conjunction with FIGS. 2-8 and 22-23. The computer code 97 includes an algorithm for assessing and managing a plurality of software applications for remote migration. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 21) may be used as a computer usable medium having a computer readable program code embodied therein, wherein the computer readable program code comprises the computer code 97.

While FIG. 21 shows the computer system 90 as a particular configuration of hardware and software, any configuration of hardware and software, as would be known to a person of ordinary skill in the art, may be utilized for the purposes stated supra in conjunction with the particular computer system 90 of FIG. 21. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for managing a plurality of software applications of a business, said method comprising:
   a processor of a computer system calculating a business criticality rating for each of said applications, said business criticality rating being a rating relating to the business as a whole;
   said processor calculating an operational criticality rating for each of said applications, said operational criticality rating being a rating relating to internal interfaces within the business;
   said processor calculating an application complexity rating for each of said applications, said application complexity rating calculated as a sum of a rating for code complexity, a rating for data complexity, a rating for business complexity, a rating for problem complexity, and a rating for application stability;
   said processor calculating an application profile rating for each of said applications, said application profile rating being a function of at least one of: level of customization, number of concurrent users, number of software modules, number of severity-1 reports per month, number of severity-2 reports per month, and number of major/minor releases per month;
   said processor computing for each of said applications an application assessment score as a weighted function of the business criticality rating, the operational criticality rating, the application complexity rating, and the application profile rating;
   said processor selecting a delivery model for each of said applications as a function of the application assessment score and at least one delivery model override, wherein the selected delivery model is a Local model, a Remote model, or a Local-Remote model, wherein the Local model, the Remote model, and the Local-Remote model are each relative to a local geographical area, wherein the Local model has all workforce people located in the local geographical area, wherein the Remote model has all workforce people located external to the local geographical area, and wherein the Local-Remote model has some workforce people located in the local geographical area and other workforce people located external to the local geographical area; and
   said processor storing an identification of the selected delivery model for each of said applications in a computer readable storage device of the computer system.

2. The method of claim 1, wherein said weighted function is a linearly weighted function of the business criticality rating, the operational criticality rating, the application complexity rating, and the application profile rating.

3. The method of claim 1, wherein said weighted function is a non-linearly weighted function of the business criticality rating, the operational criticality rating, the application complexity rating, and the application profile rating.

4. The method of claim 1, said method further comprising grouping those applications for which the Remote model or the Local-remote model has been selected by the selecting step into at least one partition such that each partition includes at least one of said applications.

5. The method of claim 4, wherein the grouping is based on a business area of the applications being grouped.

6. The method of claim 4, wherein the grouping is based on a business function, technology area, or a total number of full-time equivalents of the applications being grouped.

7. The method of claim 4, said method further comprising:
   providing a number of full-time equivalents (FTEs) for each partition;
   assigning a first percent of said FTEs to local locations; and
   assigning a second percent of said FTEs to a remote location, wherein the sum of the first percent and the second percent is about 100 percent.

8. The method of claim 4, said method further comprising:
   after said grouping, sequencing the partitions for remote migration; and
   generating a master migration schedule which reflects said sequencing.

9. The method of claim 8, said method further comprising:
   calculating for each of said applications a documentation score;
   calculating for each of said partitions an average documentation score as an average over the documentation scores of the applications in each partition; and
   calculating for each of said partitions an average application assessment score as an average over the application assessment scores of the applications in each partition,
   wherein said sequencing is a function of the average application assessment scores and the average documentation scores of the partitions.

10. The method of claim 1, wherein the local geographical area consists of one country.

11. The method of claim 10, wherein the one country is the United States.

12. The method of claim 1, wherein the local geographical area consists of a plurality of countries.

13. A computer program product, comprising a computer readable storage medium having a computer readable program code stored therein, said program code configured to be executed by a processor of a computer system to implement a method for managing a plurality of software applications of a business, said method comprising:

calculating a business criticality rating for each of said applications, said business criticality rating being a rating relating to the business as a whole;

calculating an operational criticality rating for each of said applications, said operational criticality rating being a rating relating to internal interfaces within the business;

calculating an application complexity rating for each of said applications, said application complexity rating calculated as a sum of a rating for code complexity, a rating for data complexity, a rating for business complexity, a rating for problem complexity, and a rating for application stability;

calculating an application profile rating for each of said applications, said application profile rating being a function of at least one of: level of customization, number of concurrent users, number of software modules, number of severity-1 reports per month, number of severity-2 reports per month, and number of major/minor releases per month;

computing for each of said applications an application assessment score as a weighted function of the business criticality rating, the operational criticality rating, the application complexity rating, and the application profile rating;

selecting a delivery model for each of said applications as a function of the application assessment score and at least one delivery model override, wherein the delivery model is selected as function of the application assessment score and at least one delivery model override; wherein the selected delivery model is a Local model, a Remote model, or a Local-Remote model, wherein the Local model, the Remote model, and the Local-Remote model are each relative to a local geographical area, wherein the Local model has all workforce people located in the local geographical area, wherein the Remote model has all workforce people located external to the local geographical area, wherein the Local-Remote model has some workforce people located in the local geographical area and other workforce people located external to the local geographical area; and storing an identification of the selected delivery model for each of said applications in a computer readable storage device of the computer system.

14. The computer program product of claim 13, wherein the computer readable program code is embodied in a spreadsheet having calculated fields with associated calculational formulas.

15. The computer program product of claim 13, wherein said weighted function is a linearly weighted function of the business criticality rating, the operational criticality rating, the application complexity rating, and the application profile rating.

16. The computer program product of claim 13, wherein said weighted function is a non-linearly weighted function of the business criticality rating, the operational criticality rating, the application complexity rating, and the application profile rating.

17. The computer program product of claim 13, said method further comprising grouping those applications for which the Local model or the Local-Remote model has been selected by the selecting step into at least one partition such that each partition includes at least one of said applications.

18. The computer program product of claim 17, said method further comprising:

after said grouping, sequencing the partitions for remote migration; and generating a master migration schedule which reflects said sequencing.

19. The computer program product of claim 18, said method further comprising:

calculating for each of said applications a documentation score;

calculating for each of said partitions an average documentation score as an average over the documentation scores of the applications in each partition; and calculating for each of said partitions an average application assessment score as an average over the application assessment scores of the applications in each partition, and wherein said sequencing is a function of the average application assessment scores and the average documentation scores of the partitions.

20. The computer program product of claim 17, wherein the grouping is based on a business function, technology area, or a total number of full-time equivalents of the applications being grouped.

21. The computer program product of claim 17, said method further comprising:

providing a number of full-time equivalents (FTEs) for each partition;

assigning a first percent of said FTEs to local locations; and assigning a second percent of said FTEs to a remote location, wherein the sum of the first percent and the second percent is about 100 percent.

22. The computer program product of claim 13, wherein the local geographical area consists of one country.

23. The computer program product of claim 22, wherein the one country is the United States.

24. The computer program product of claim 13, wherein the local geographical area consists of a plurality of countries.

25. A computer system comprising a processor and a computer readable memory unit coupled to the processor, said memory unit containing instructions configured to be executed by the processor to implement a method for managing a plurality of software applications of a business, said method comprising:

calculating a business criticality rating for each of said applications, said business criticality rating being a rating relating to the business as a whole;

calculating an operational criticality rating for each of said applications, said operational criticality rating being a rating relating to internal interfaces within the business;

calculating an application complexity rating for each of said applications, said application complexity rating calculated as a sum of a rating for code complexity, a rating for data complexity, a rating for business complexity, a rating for problem complexity, and a rating for application stability;

calculating an application profile rating for each of said applications, said application profile rating being a function of at least one of: level of customization, number of concurrent users, number of software modules, number of severity-1 reports per month, number of severity-2 reports per month, and number of major/minor releases per month;

computing for each of said applications an application assessment score as a weighted function of the business criticality rating, the operational criticality rating, the application complexity rating, and the application profile rating;

selecting a delivery model for each of said applications as function of the application assessment score and at least one delivery model override, wherein the delivery model is selected as function of the application assessment score and at least one delivery model override; wherein the selected delivery model is a Local model, a Remote model, or a Local-Remote model, wherein the Local model, the Remote model, and the Local-Remote model are each relative to a local geographical area, wherein the Local model has all workforce people located in the local geographical area, wherein the Remote model has all workforce people located external to the local geographical area, wherein the Local-Remote model has some workforce people located in the local geographical area and other workforce people located external to the local geographical area; and storing an identification of the selected delivery model for each of said applications in a computer readable storage device of the computer system.

26. The computer system of claim 25, said method further comprising grouping those applications for which the Local model or the Local-Remote model has been selected by the selecting step into at least one partition such that each partition includes at least one of said applications.

27. The computer system of claim 26, said method further comprising:

sequencing the partitions for remote migration; and generating a master migration schedule which reflects said sequencing.

28. The computer system of claim 27, said method further comprising:

calculating for each of said applications a documentation score;

calculating for each of said partitions an average documentation score as an average over the documentation scores of the applications in each partition;

calculating for each of said partitions an average application assessment score as an average over the application assessment scores of the applications in each partition, wherein said sequencing is a function of the average application assessment scores and the average documentation scores of the partitions.

29. The computer system of claim 26, wherein the grouping is based on a business function, technology area, or a total number of full-time equivalents of the applications being grouped.

30. The computer system of claim 26, said method further comprising:

providing a number of full-time equivalents (FTEs) for each partition;

assigning a first percent of said FTEs to local locations; and assigning a second percent of said FTEs to a remote location, wherein the sum of the first percent and the second percent is about 100 percent.

\* \* \* \* \*